United States Patent [19]

D'Alelio

[11] Patent Number: 5,290,908
[45] Date of Patent: Mar. 1, 1994

[54] ACETYLENIC END-CAPPED POLYIMIDES

[75] Inventor: Gaetano F. D'Alelio, South Bend, Ind.

[73] Assignee: The University of Notre Dame du Lac, Notre Dame, Ind.

[21] Appl. No.: 543,923

[22] Filed: Jan. 24, 1975

Related U.S. Application Data

[63] Continuation-in-part of Ser. No. 363,800, May 25, 1973, Pat. No. 3,998,786, and a continuation-in-part of Ser. No. 363,801, May 25, 1973, Pat. No. 3,897,395.

[51] Int. Cl.$^5$ .................. C08G 69/26; C08G 73/10
[52] U.S. Cl. .................................. 528/353; 528/125; 528/126; 528/128; 528/170; 528/172; 528/173; 528/174; 528/179; 528/188; 528/207; 528/208; 528/220; 528/222; 528/223; 528/229; 528/350; 528/351; 528/352; 526/259; 526/263; 526/285; 525/422; 525/436
[58] Field of Search ............... 528/353, 125, 126, 128, 528/170, 172, 173, 174, 179, 188, 207, 208, 220, 222, 223, 229, 350, 351, 352; 526/259, 263, 285; 525/422, 436

[56] References Cited

U.S. PATENT DOCUMENTS

| | | | |
|---|---|---|---|
| 3,179,634 | 4/1965 | Edwards | 528/353 |
| 3,179,635 | 4/1965 | Frost et al. | 528/353 |
| 3,511,807 | 5/1970 | Lovejoy | 528/353 |
| 3,663,510 | 5/1972 | Peterson | 528/353 |
| 3,845,018 | 10/1974 | Bilow et al. | 260/47 Cp |
| 3,879,349 | 4/1975 | Bilow et al. | 260/47 UA |

OTHER PUBLICATIONS

Hughes proposal to U.S. Government Report No. Tp-989, Jun. 1968, pp. 3-5, 3-10, 3-27 and 3-28.
Technical Report AFML-TR-70-250, dated Dec. 15, 1970, pp. 23-25 and 60. (Landis et al).
Hughes proposal to U.S. Government, Report No. TP-1033, Dec. 1968, pp. 14 and 15.
Hughes proposal to U.S. Government, Report No. TP-70-110, Oct. 1970, pp. 3-11 to 3-13 and 3-16 to 3-18.
Hughes proposal to U.S. Government, Report No. Tp 71-180, Nov. 1971, pp. 3-7 and 3-13 to 3-15.
Hughes Seventh Quarterly Report to U.S. Government, under Contract No. F 33615-71-C-1228, Oct. 1972, pp. 3, 12 and 24. (Bilow et al).

Primary Examiner—John Kight, III
Assistant Examiner—P. Hampton-Hightower
Attorney, Agent, or Firm—Michael, Best & Friedrich

[57] ABSTRACT

Aromatic polyimides with acetylenic end groups are cured by coupling together thermally or catalytically using cuprous salts as catalysts to increase molecular weight with little or no by-product formation. These polyimides can be shaped and formed prior to the coupling.

The acetylenic end-capped aromatic polyimides are formed by the reaction of an aromatic dianhydride, an acetylenic organic monoamine compound which will provide the reactive end groups and optionally an aromatic diamine.

40 Claims, No Drawings

ACETYLENIC END-CAPPED POLYIMIDES

RELATIONSHIP TO OTHER APPLICATIONS

This application is a continuation-in-part of my co-pending applications Ser. No. 363,800, now U.S. Pat. No. 3,998,786 and Ser. No. 363,801, now U.S. Pat. No. 3,897,395, both filed on May 25, 1973.

BACKGROUND OF THE INVENTION

1. Field of the Invention

This invention relates to acetylenic end-capped polyimides, processes for preparing polymeric materials therefrom and polymeric materials so prepared and more particularly to low molecular weight polyimides and processes for converting low molecular weight polyimides, with minimum elimination of by-products, to high molecular weight, thermally-stable polymers.

2. Prior Art

The synthesis in recent years of a number of thermally-stable polymers (e.g. polyimides) has supplied materials whose properties allow them to meet some critical end-use requirements. Their application to other uses is limited by a number of their specific properties, among which is intractability. This necessitates their use in dilute solutions in such exotic solvents as sulfuric acid, for example, to be spun into fibers. This excludes their use in laminations and in moldings. In addition, once isolated from the solvent, high temperatures are required to convert them to the fully condensed or cured final state. This curing is accompanied by the elimination of volatile by-products.

In contrast, polymers containing oxirane structures, such as epoxy-phenolics, can be cured at reasonably low temperatures with a minimum of by-products. However, the thermal stabilities of the oxirane polymers fall below those, for example, of the stable polybenzimidazoles. Thus, it is desirable to prepare oligomers which will propagate to higher molecular weights with minimum volatile elimination at relatively low temperatures and which will possess thermal stabilities reasonably higher than epoxy phenolics, preferably approaching the stabilities demonstrated by the polyimides and similar polyheterocyclics.

SUMMARY OF THE INVENTION

According to the present invention there is provided an acetylenic end-capped polyimide of the formula:

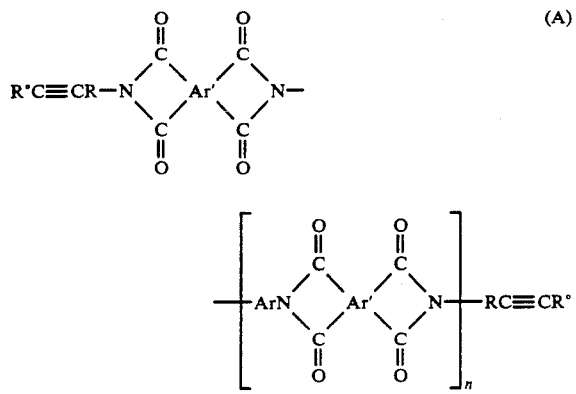

wherein
Ar' is a tetravalent aromatic organic radical, the four carbonyl groups being attached directly to separate carbon atoms and each pair of carbonyl groups being attached to adjacent or peri carbon atoms in the Ar' radical,
Ar is a divalent aromatic organic radical,
R is a divalent hydrocarbon radical of 1 to 14 carbon atoms,
R° is H or a monovalent hydrocarbon radical of 1 to 12 carbon atoms and
n is 0 or a positive integer of at least one,
n may be as high as 100 or more, but
n is preferably 1 to 20, most preferably 1 to 10.

By a polyimide is meant a chemical compound having at least two imide nitrogens as for example in the structure:

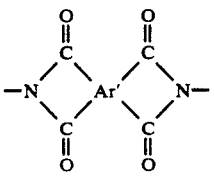

Thus, when n is zero in the above formula (A), the polyimide is

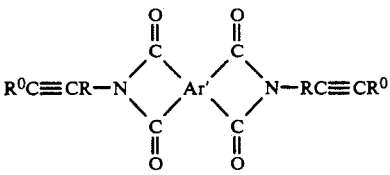

There is also provided a cross-linked polymer prepared by heating the polyimide of formula (A) at a temperature in the range of about 150° to 450° C., preferably in the presence of a cuprous salt catalyst.

DETAILED DESCRIPTION OF THE INVENTION

The polyimides prepared and used in the process of the present invention are prepared by reacting m+1 moles of an aromatic dianhydride, m moles of an aromatic diamine and 2 moles of an acetylenic organic monoamine to form oligomeric or higher molecular weight polyimides. When n in formula (A) is zero, m is also zero.

The aromatic dianhydride has the general formula:

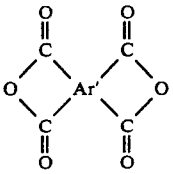

wherein Ar' is a tetravalent aromatic organic radical, preferably containing at least one ring of six carbon atoms, said ring characterized by benzenoid unsaturation, the four carbonyl groups being attached directly to separate carbon atoms and each pair of carbonyl groups being attached to adjacent or peri carbon atoms in the Ar' radical. Any of the aromatic tetracarboxylic acid dianhydrides known in the prior art can be used. Among the useful dianhydrides are 3,3'-4,4'-benzophenonetetracarboxylic acid dianhydride, pyromellitic dianhydride, 2,3,6,7-naphthalene tetracarboxylic acid dianhydride, 3,3',4,4'-diphenyl tetracarboxylic acid dianhydride, 1,2,5,6-naphthalene tetracarboxylic acid dianhydride, 2,2',3,3'-diphenyl tetracarboxylic acid dianhydride, 2,2-bis(3',4'-dicarboxyphenyl)propane dianhydride, 2,2-bis(3',4'-dicarboxyphenyl)hexafluoropropane dianhydride, 3,4,9,10-perylene tetracarboxylic acid dianhydride, bis(3,4-dicarboxyphenyl)ether dianhydride, naphthalene-1,2,4,5-tetracarboxylic acid dianhydride, naphthalane-1,4,5,8-tetracarboxylic acid dianhydride, decahydronaphthalene-1,4,5,8-tetracarboxylic acid dianhydride, 4,8-dimethyl-1,2,3,5,6,7-hexahydronaphthalene-1,2,5,6-tetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, phenanthrene-1,8,9,10-tetracarboxylic acid dianhydride, cyclopentane-1,2,3,4-tetracarboxylic acid dianhydride, pyrrolidine-2,3,4,5-tetracarboxylic acid dianhydride, pyrazine-2,3,5,6-tetracarboxylic acid dianhydride, 2,2-bis(2,3-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, bis(3,4-dicarboxyphenyl)sulfone dianhydride, and benzene-1,2,3,4-tetracarboxylic acid dianhydride. The first three mentioned dianhydrides are most preferred. Preferred aromatic dianhydrides are those wherein Ar' is selected from the group consisting of

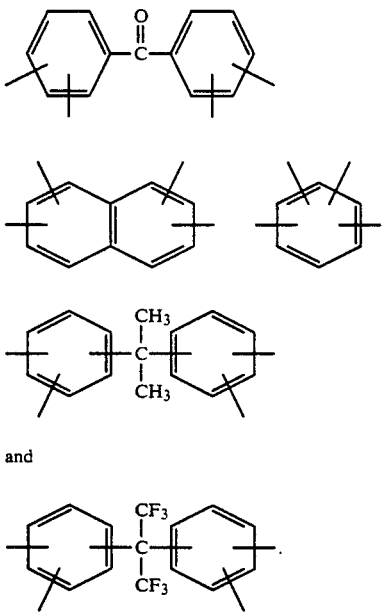

and

Aromatic diamines useful in preparing the polyimides have the general formula:

$NH_2$-Ar-$NH_2$ wherein Ar is a divalent aromatic organic radical. Preferred aromatic diamines are those wherein Ar is a divalent benzenoid radical selected from the group consisting of

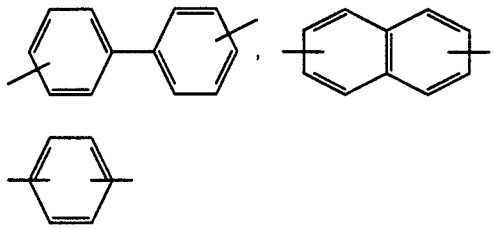

and multiples thereof connected to each other by $R_{11}$, e.g.,

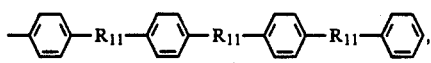

wherein $R_{11}$ is an alkylene chain of 1-3 carbon atoms, —CH=CH—,

—O—, —S—, and —$SO_2$—.

Examples of aromatic diamines which are suitable for use in the present invention are 4,4'-diaminodiphenyl propane, 4,4'-diamino-diphenyl methane, benzidine, 3,3'-dichlorobenzidine, 4,4'-diamino-diphenyl sulfide, 3,3'-diamino-diphenyl sulfone, 4,4'-diamino-diphenyl sulfone, 4,4'-diamino-diphenyl ether, 1,5-diamino naphthalene, 4,4'-diamino-diphenyl diethylsilane, 4,4'-diamino-diphenyl diphenyl-silane, 4,4'-diamino-diphenyl ethyl phosphine oxide, 4,4'-diamino-diphenyl phenyl phosphine oxide, 4,4'-diamino-diphenyl N-methylamine, 4,4'-diamino-diphenyl N-phenyl amine and mixtures thereof. 3,3'-dimethyl-4,4'-diaminodiphenylmethane, 3,3'-diethyl-4,4'-diaminodiphenylmethane, 3,3'-dimethoxy-4,4'-diaminodiphenylmethane, 3,3'-diethoxy-4,4'-diaminodiphenylmethane, 3,3'-dichloro-4,4',4,4'-diaminodiphenylmethane, 3,3'-dibromo-4,4'-diaminodiphenylmethane, 3,3'-dicarboxy-4,4'-diaminophenylmethane, 3,3'-dihydroxy-4,4'-diaminophenylmethane, 3,3'-disulpho-4,4'-diaminodiphenylmethane, 3,3'-dimethyl-4,4'-diaminodiphenylether, 3,3'-diethyl-4,4'-diaminodiphenylether, 3,3'-dimethoxy-4,4'-diaminodiphenylether, 3,3'-diethoxy-4,4'-diaminodiphenylether, 3,3'-dichloro-4,4'-diaminodiphenylether, 3,3'-dibromo-4,4'-diamino diphenylether, 3,3'-dicarboxy-4,4'-diaminodiphenylether, 3,3'-dihydroxy-4,4'-diaminodiphenylether, 3,3'-disulfo-4,4'-diaminodiphenylether, 3,3'-dimethyl-4,4'-diaminodiphenylsulfide, 3,3'-diethyl-4,4'-diaminodiphenylsulfide, 3,3'-dimethoxy-4,4'-diaminodiphenylsulfide, 3,3'-diethoxy-4,4'-diaminodiphenylsulfide, 3,3'-dichloro-4,4'-diaminodiphenylsulfide, 3,3'-dibromo-4,4'-diaminodiphenylsulfide, 3,3'-dicarboxyl-4,4'-diaminodiphenylsulfide, 3,3'-dihydroxy-4,4'-diaminodiphenylsulfide, 3,3'-disulfo-4,4'-diaminodiphenylsulfide, 3,3'-dimethyl-4,4'-diaminodiphenylsulfone, 3,3'-diethoxy-4,4'-diaminodiphenylsulfone, 3,3'-dichloro-4,4'-diaminodiphenylsulfone, 3,3'-dicarboxy-4,4'-diaminodiphenylsulfone, 3,3'-dihydroxy-4,4'-diaminodiphenylsulfone, 3,3'-disulfo-4,4'-diaminodiphenylsulfone, 3,3'-diethyl-4,4'-diaminodiphenylpropane, 3,3'-dimethoxy-4,4'-diaminodiphenylpropane, 3,3'-dibromo-4,4'-diaminodiphenylpropane, 3,3'-dichloro- 4,4'-diaminodiphenylpropane, 3,3'-dicarboxy-4,4'-diaminodiphenylpropane, 3,3'-dihydroxy-4,4'-diaminodiphenylpropane, 3,3'-disulfo-4,4'-diaminodiphenylpropane, 3,3'-dimethyl-4,4'-diaminobenzophenone, 3,3'-dimethoxy-4,4'-diaminobenzophenone, 3,3'-dichloro-4,4'-diaminobenzophenone, 3,3'-dibromo-4,4'-diaminobenzophenone, 3,3'-dicarboxy-4,4'-diaminobenzophenone, 3,3'-dihydroxy-4,4'-diaminobenzophenone, 3,3'-disulphodiaminobenzophenone, 3,3'-diaminodiphenylmethane, 3,3'-diaminodiphenylether, 3,3'-diaminodiphenylsulfide, 3,3'-diaminodiphenylsulfone, 3,3'-diaminodiphenylpropane, 3,3'-diaminobenzophenone, 2,4-diaminotoluene, 2,6-diaminotoluene, 1-isopropyl-2,4-phenylenediamine, 2,4-diaminoanisole, 2,4-diaminomonochlorobenzene, 2,4-diaminofluorobenzene, 2,4-diaminobenzoic acid, 2,4-diaminophenol, and 2,4-diaminobenzenesulfonic acid, and phenylene diamines. Preferred diamines are 4,4'-oxydianiline, 4,4'-sulfonyldianiline, 4,4'-methylene dianiline, 4,4'-diaminobenzophenone, 4,4'-diaminostilbene and the phenylene diamines.

The acetylenic organic monoamine has the formula $H_2NR-C\equiv CR°$ where R is a divalent hydrocarbon radical of 1 to 14 carbon atoms and R° is hydrogen or a monovalent hydrocarbon radical of 1 to 12 carbon atoms. The acetylenic amine serves to provide the terminal groups $-C\equiv CR°$ in the compounds of this invention.

The R and R° radicals in the amine each can be aliphatic, aromatic (particularly benzenoid aromatic) and cycloaliphatic.

Illustrative examples of R are: $-CH_2-$, $-CH_2CH_2-$, $-C_3H_6$, $-C_8H_{16}-$, $-C_{12}H_{24}-$, $-C_6H_4C_6H_4-$, $-C_6H_4-$, $-C_6H_4OC_6H_4-$, $-C_6H_4SO_2C_6H_4-$, $-C_6H_4CH_2C_6H_4-$, $-H_4C_6CH=CHC_6H_4-$,

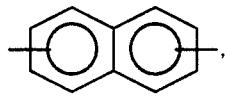

$-CH_2C_6H_4-$,

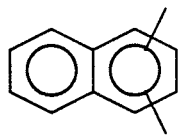

$-CH_2CH_2C_6H_4-$, $-(CH_2)_3C_6H_4-$, $-C_6H_{10}-$, $-C_6H_9(CH_3)-$, and $-C_6H_8-$.

Illustrative examples of R° are: $-CH_3$, $-C_2H_5$, $-C_3H_7$, $-C_4H_9$, $-C_8H_{17}$, $-C_{12}H_{25}$, $-C_6H_5$, $-C_6H_4-C_6H_5$, $-C_{10}H_7$, $-C_6H_{11}$, $-C_6H_{10}-CH_3$, $-CH_2C_6H_5$, $-C_6H_3Cl_2$ and $-C_6H_4OC_6H_5$.

Specific examples of the monoamines are: $H_2NCH_2C\equiv CCH_3$, $H_2NC_6H_4C\equiv CCH_3$, $H_2NCH_2C_6H_4C\equiv CCH_3$, $H_2NC_6H_4CH_2C\equiv CCH_3$, $NH_2C_6H_4SO_2C_6H_4C\equiv CH$, $H_2N(CH_2)_6C\equiv CH$, $H_2NCH_2C_6H_4C\equiv CH$, $H_2NC_6H_4CH_2C\equiv CH$, $H_2N(CH_2)_3C_6H_4C\equiv CH$, $H_2NC_6H_4C\equiv CH$, $H_2NCH_2C\equiv CH$. Preferred monoamines are the aminophenyl acetylenes such as 3-amino and 4-amino phenyl acetylene, propargyl amine and $H_2NC_6H_4SO_2C_6H_4C\equiv CH$.

The polyimide starting materials are prepared preferably according to the azeotroping process described in my copending application Ser. No. 363,800, filed May 25, 1973, now U.S. Pat. No. 3,998,786, the disclosure of which is hereby incorporated by reference. Briefly, the process involves reacting the dianhydride with the diamine and monoamine in a phenol solvent of the formula

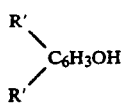

where each R' is hydrogen or a methyl radical in the presence of certain organic azeotroping agents, particularly cyclic hydrocarbons of 6 to 8 carbon atoms and most preferably benzene or toluene until most of the water of reaction is eliminated. The reaction temperature is less than 140° C. and also should be below the boiling point of the phenol used but higher than the boiling point of the azeotroping agent. The vapor phase temperature lies between that of the water azeotrope and no higher than 95° C. As the water of reaction and azeotroping agent are removed from the reaction mixture, quantities of the azeotroping agent are returned to the reaction mixture so as to maintain the temperature and reaction mixture volume substantially constant. It is preferred that the process be continuous with continuous removal of water and continuous return of azeotroping agent. This is conveniently done by the use of a conventional Dean-Stark trap and condenser wherein after the azeotrope condenses, the water preferably sinks to the bottom of the trap for subsequent removal and the azeotroping agent overflows the trap and returns to the reaction mixture. Initially, the trap is filled with azeotroping agent.

The polyimides prepared by the above-described process will have the formula (A) described previously.

The polyimides of formula (A) can also be prepared by prior conventional methods by reacting the aromatic dianhydride with the acetylenic organic monoamine (optionally in the presence of the aromatic diamine) in a suitable solvent. The amic acid intermediate is then dehydrated thermally or with acetic anhydride.

The chain-extending process used to make high molecular weight polyimides occurs by the self-coupling of the starting polyimide of formula (A). Initiation usually occurs thermally by heating at a temperature of at least about 150° C., and less than about 450° C., preferably from about 200° to about 320° C. The polyimide can also be chain-extended in the presence of air (oxygen) by heating in the presence of a catalyst, i.e., catalytic polymerization in the presence of oxygen using a catalytic amount of a cuprous salt, e.g., cuprous chloride, cuprous sulfate, cuprous acetate, etc. Generally, about 0.1 to 5% by weight of the catalyst is sufficient, based on the weight of the polyimide. Alternately, the acetylenic end-capped polyimides of formula (A) can be chain-extended as bis-dipolarophiles by the addition reaction with bis-dipoles such as phenylenedinitrileoxide (BDNO) and phenylenedinitrileimine (BDNI) as disclosed in the aforesaid application Ser. No. 363,801, now U.S. Pat. No. 3,897,395.

Some specific acetylene end-capped polyimides which can be chain-extended by the above-described processes are:

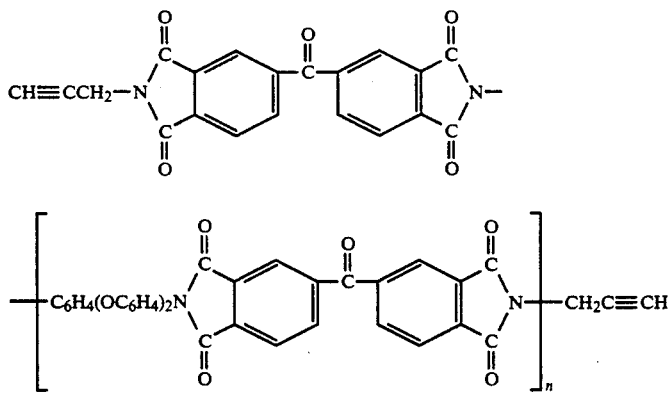

(1)

Preferably n is at least 2, most preferably 4.

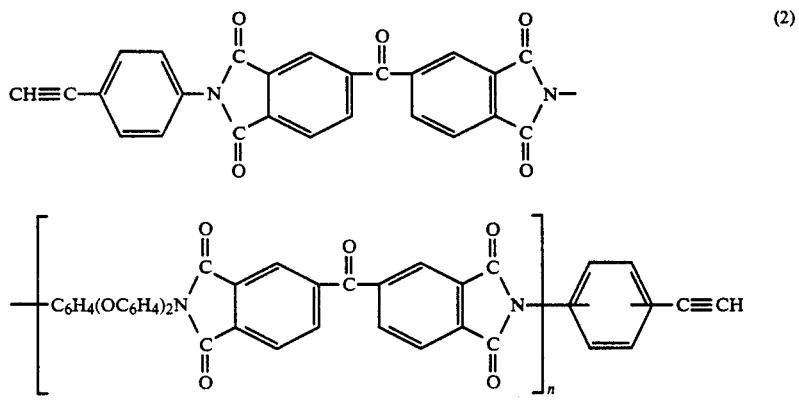

(2)

Preferably n is at least 2, most preferably 4.

The polyimides of the present invention have a number of uses. These include use of the solutions before curing as wire and insulating varnishes and to impregnate fabric substrates used in making flexible and rigid electronic circuit boards and in making structural laminates. The solutions can be used to make fibers and films and as adhesives, particularly for film substrates, useful in aerospace and electronics applications. The powders can be used as molding powders and to make fibers, films and foams.

The invention can be further understood by the following examples in which parts and percentages are by weight unless otherwise indicated.

EXAMPLE 1

(a) Reaction of Pyromellitic Dianhydride with Propargyl Amine in DMAC

Into a 100-ml. three-necked, round-bottomed flask equipped with a magnetic stirrer, condenser, thermometer, nitrogen atmosphere, etc., were placed 45 ml. of N,N-dimethyl acetamide (DMAC) and 9.91 g. (0.0454 mole) of pyromellitic dianhydride. Propargyl amine, 5 g. (0.0909 mole) was then added slowly with stirring at room temperature. The temperature of the mixture rose to about 60° C. after the addition of propargyl amine and remained clear and homogeneous. Stirring was continued for 1 hour at 60° C.; then the temperature was raised gradually to 155° C. and reflux continued at that temperature for 4 hours. As the temperature reached 100° C. a large amount of precipitate formed which did not redissolve as the heating was continued. The reaction mixture was allowed to cool to room temperature overnight; the precipitate which formed was removed by filtration, washed with cold DMAC and recrystallized from hot N,N-dimethylformamide (DMF). The yield was 9.18 g., 70% of the theory. Its melting point was determined by Differential Thermal Analysis, in nitrogen, which showed it to be 323° C., at which temperature a highly exothermic reaction occurs, i.e., it cured.

The recrystallized diimide was not soluble in either hot or cold DMAC but soluble in hot DMF. Its infrared spectrum showed the characteristic absorptions for —C≡CH at 3.04 and 14.45μ, for —C≡C— at 4.73μ, for the imide,

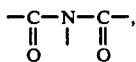

at 5.85μ and for >C=O at 5.63μ. The acid number of the sample, determined by potentiometric titration, was zero.

Analysis: Calc'd. for $C_{16}H_8N_2O_4$: C, 65.75; H, 2.74; N, 9.59; O, 21.92. Found: C, 65.55; H, 2.79; N, 9.84; O, 21.73.

(b) Cycloaddition Polymerization in Solution

The diimide prepared in Example 1(a) was added to DMAC in a small test tube to prepare a 12% solution. Then from $2 \times 10^{-2}$ to $3 \times 10^{-3}$ mole of solid, 1,4-benzenedinitrile oxide (BDNO) was added slowly with stirring to the solution of the diimide, the container swept out with deoxygenated nitrogen and capped. The solution was clear at room temperature until about 90% of the BDNO was added. The solution was heated slowly to 100° C. during which time more precipitate formed. DMAC was added to double the volume and then the reaction mixture was heated at a rate of 10° C. per hour to 130° C. at which point there was no solution. The precipitate present was isolated by centrifugation and the filtrate evaporated at 130° C. to obtain a very small amount of polymer film.

The precipitate was placed between glass covers and heated on a Fisher-Johns melting point block having an upper limit of 300° C. The precipitate darkened but did not melt at 300° C. and was soluble in $H_2SO_4$.

EXAMPLE 2

(a) Reaction of 1,4,5,8-Naphthalenetetracarboxylic Acid Dianhydride and Propargyl Amine in DMF A mixture of 5.3634 g. (0.02 mole) of the above naphthalene dianhydride and 2.7243 g. (~0.049 mole) of propargyl amine was refluxed in 50 ml. of DMF at 135° C. for six hours. The solution was then allowed to cool to room temperature and 3.4231 g. of a solid was recovered by filtration. The filtrate on evaporation to dryness under reduced pressure, yielded 2.6263 g. of additional solid. The infrared spectra of both solids were identical and showed absorptions at $3.05\mu$ for the acetylenic group and at $5.00\mu$ for the imide linkage. Their DTA traces exhibited similar behaviors; a weak endotherm was found at 225° C. which was followed by a strong exotherm at 250° C. This was possibly due to melting followed by polymerization, i.e., curing. The carboxyl number of both solids was zero, suggesting the structure:

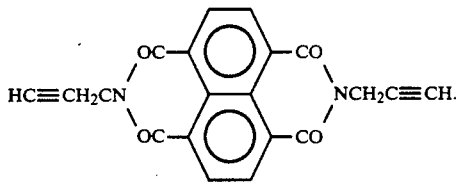

The yield of product, recrystallized from hot DMAC, was 88.4%.

Analysis: Calc'd for $C_{22}H_{10}N_2O_4$: C, 70.18; H, 2.94; N, 8.18; O, 18.70. Found: C, 69.98; H, 3.11; N, 8.21; O, 18.70.

(b) Cycloaddition Polymerization in Solution

The diimide of Example 2(a) (0.25 g., $0.75 \times 10^{-3}$ mole) was placed in a screw-capped vial, DMAC added to prepare a 20% solution and the mixture shaken until the diimide acceptor was dissolved. The solid donor, BDNO, 0.320 g. ($2 \times 10^{-3}$ mole) was then added slowly with stirring to the solution of the acceptor; the vial was stoppered and allowed to stand at room temperature for one hour, followed by heating at 90° C. for 19 hours. The cap was removed to allow the DMAC to escape and heating continued at 130° C. for 24 hours; at 150° C. for 24 hours and at 190° C. for 4 hours. There was no solution at room temperature; a solution at 130° C. with the formation of a brown precipitate having a melting point greater than 300° C.

EXAMPLE 3

Preparation of N,N'-Dipropargylpyromellitic Diimide

In a 250-ml three-necked flask fitted with a dropping funnel, a condenser and a thermometer was placed 9.91 g. (0.0455 mole) pyromellitic dianhydride dissolved in 50 ml of distilled dimethylformamide. The flask was flushed with nitrogen and maintained under a slight positive nitrogen pressure throughout the reaction period. The solution of anhydride was stirred magnetically, and a solution of 4.9488 g. (0.09 mole) of propargylamine in 50 ml of dimethylformamide was added in portions over a period of 10 minutes. During this addition, the temperature in the reaction flask rose to 52° C., and then when approximately half of the amine had been added, a copious precipitate formed. The mixture was stirred at room temperature for 2 hours and then at reflux (147° C.) for 5 hours. During this period the color changed from yellow to brown.

The mixture was allowed to cool to room temperature and was then cooled in an ice bath and filtered, giving a pale brown solid, m.p.>300° C., dried in vacuum oven at 70° C., 7.9554 g. (61%), recrystallized once from dimethylformamide to give 6.4998 g. of a pale beige, crystalline solid, m.p. 323° C., determined by Differential Thermal Analysis. The infrared spectrum of the product was in excellent agreement with that described in Example 1(a).

The dark-brown filtrate was concentrated on a rotary evaporator and finally dried for 2 days at 70° C. in a vacuum oven to give 7.6133 g. of a dark-brown, oily solid from which several attempts were made to isolate additional product. Decolorizations using activated charcoal or alumina were not successful as were the attempted crystallizations from dimethylformamide and dimethylformamide-water mixtures.

EXAMPLE 4

Preparation of N,N'-Dipropargyl-1,4,5,8-Naphthalenetetracarboxylic Acid Diimide

In a 250-ml round-bottom flask, equipped with a mechanical stirrer was placed 10.3541 g. (0.036 mole) of 1,4,5,8-naphthalene tetracarboxylic acid dianhydride in 100 ml DMF and the system purged with nitrogen. To this solution was added 4.9310 g. (0.089 mole) of propargyl amine, causing the temperature to rise to 46° C. Then heating was begun and continued at 135° C. for 5 hours. Then the apparatus was fitted with a distillation head and approximately 2 ml of distillate were removed over a one-hour period by heating at 135° C. After cooling, the solid material was isolated by filtration, washed with DMF and vacuum-dried to give a tan solid, 9.0084 g. (68.3%), recrystallization from DMAC gave 4.5840 g. of the diimide whose infrared spectrum was identical to that of Example 2(a).

The filtrate and washings were evaporated under vacuum to yield a black solid, 5.5363 g. (42.0%). Numerous attempts to recrystallize this black solid into a satisfactory product were not successful.

EXAMPLE 5

(a) Synthesis of Propargyl-Terminated Oligomeric Polyimide (BTPA-1). Reaction of BTCA, ODA and Propargyl Amine (2:1:2)

In an m-cresol:benzene azeotropic apparatus was placed a solution of 3,3',4,4'-benzophenonetetracarboxylic acid dianhydride (BTCA) (29.001 g., 0.09 mole) in 200 ml. of m-cresol and 50 ml. of benzene. The mixture was warmed to approximately 50° C. and a solution of 4,4'-oxydianiline (ODA) (9.011 g., 0.045 mole) in 150 ml. of m-cresol was added, forming a slight amount of yellow precipitate. After 10 minutes, a solution of propargyl amine (5 g., 0.0908 mole) in 50 ml. of m-cresol was added and the solution heated to reflux. During 2 hours of reflux, 3.3 ml. of water was collected. After cooling, the deep red solution was concentrated on a rotary flash evaporator. A small sample was removed for analysis and approximately 5 mg. of t-butyl catechol was added to the bulk of the residue, which was vacuum-dried at 100° C. for 30 hours, and then at 150° C. for 12 hours, to give sample A, 37.850 g. (95%) as a dark-brown solid. It softened at 270° C.; partially melted between 280°-300° C., but quickly rehardened at 300° C., i.e., cured.

Analysis: Calc'd. for $C_{52}H_{26}N_4O_{11}$: C, 70.75; H, 2.97; N, 6.35; O, 19.94. Found: C, 70.84; H, 3.13; N, 6.31; O, ----- .

(b) Polymerization of BTPA-1

A sample of BTPA-1 was mixed with about 5% by weight of $Cu_2Cl_2$ (cuprous chloride) and spread on a hot plate preheated to the melting point of the BTPA-1. The sample was open to air. An infusible, insoluble polymer was obtained due to the oxygen coupling of the acetylene terminal groups.

When other dianhydrides of

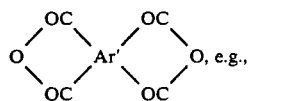

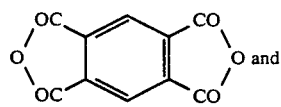

and

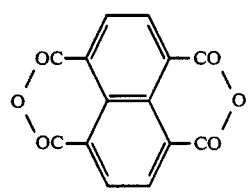

are used in equivalent amounts in Example 5(a) instead of BTCA, the corresponding completely cyclized acetylenic terminated diimide is obtained. Similarly when m-amino phenyl acetylene is used in an equivalent amount in Example 5(a) instead of propargyl amine with BTCA or the other dianhydrides, the corresponding acetylenic terminated polyimide is obtained which can also be chain-extended or cured.

EXAMPLE 6

Preparation of Propargyl-Terminated Oligomeric Polyimide (BTPA-2). Reaction of BTCA, DAPB-3,3 and Propargyl Amine (9:8:2)

In an m-cresol:benzene azeotropic apparatus was placed BTCA (2.900/g., 0.009 mole) in 20 of m-cresol and 10 ml. of benzene. The mixture was warmed to 50° C. under a nitrogen atmosphere until solution occurred. Then a solution of propargyl amine (0.1102 g., 0.002 mole) in 10 ml. of m-cresol was added and the mixture stirred for 30 minutes, after which a solution of 1,3-di(3-aminophenyoxy)benzene (DAPB-3,3) (2.3386 g., 0.008 mole) in 20 ml. of m-cresol was added and the mixture heated to reflux temperature under nitrogen for 3.5 hours and water (0.29 ml.) was collected. Then, the benzene was distilled off and the oligomer precipitated in methanol. The precipitated oligomer was washed three times in hot methanol and vacuum dried at 40° C. for 24 hours to give BTPA-2 as an off-white powder, 4.50 g. (90%), which was soluble in m-cresol, DMAC, sulfolane and dioxane and melted at 190°-215° C. and rehardened after 25 minutes at 300° C., i.e., cured. Its TGA in air when heated at a rate of 10° C./minute was at break, 400° C. and at inflection, 570° C. The percent residue at 200° C., 300° C. and 400° C. was 100%; at 500° C., 97%; at 600° C., 84%; and at 700° C. and 800° C., 0%.

Analysis: Calc'd for $C_{303}H_{156}N_{18}O_{61}$: C, 72.43; H, 3.13; N, 5.02; O, 19.43. Found: C, 72.31; H, 3.32; N, 4.86; O, -.

When an equivalent amount of each of $H_2NCH_2C_6H_4C\equiv CH$, $H_2NC_6H_4C\equiv CH$, $H_2NC_6H_4CH_2C\equiv CH$ and $H_2NC_6H_4SO_2C_6H_4C\equiv CH$ are substituted for propargyl amine in this example, the corresponding acetylenic end-capped oligomers are obtained. These oligomers also cure.

What is claimed is:

1. A polyimide of the formula:

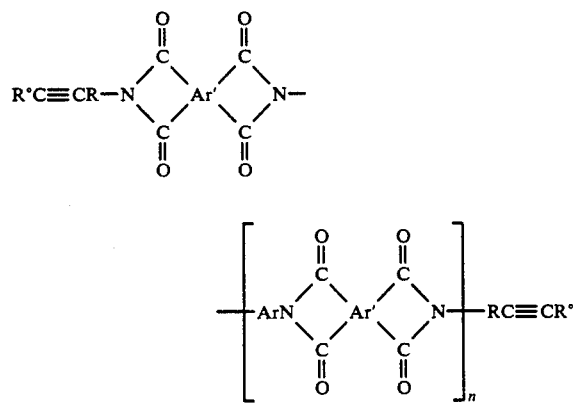

wherein
Ar' is a tetravalent aromatic organic radical, the four carbonyl groups being attached directly to separate carbon atoms and each pair of carbonyl groups being attached to adjacent or peri carbon atoms in the Ar' radical,
Ar is a divalent aromatic organic radical,
R is a divalent hydrocarbon radical of 1 to 14 carbon atoms, and
R° is H or a monovalent hydrocarbon radical of 1 to 12 carbon atoms and
n is 0 or a positive integer of at least one.

2. The polyimide of claim 1 wherein n is zero.

3. The polyimide of claim 1 wherein n is 1 to 20.

4. The polyimide of claim 1 wherein Ar' is selected from the group consisting of

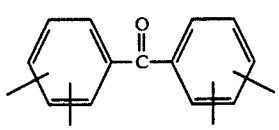

-continued

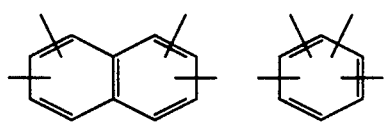

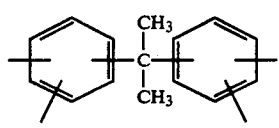

and

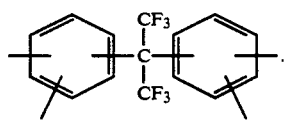

5. The polyimide of claim 1 wherein Ar is selected from the group consisting of

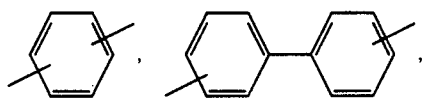

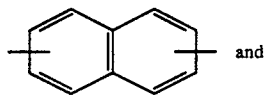 and multiples thereof connected to each other by $R_{11}$, wherein $R_{11}$ is alkylene of 1 to 3 carbon atoms,

—O—, —S—, —CH=CH, and —SO$_2$—, and Ar' is selected from the group consisting of

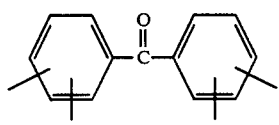

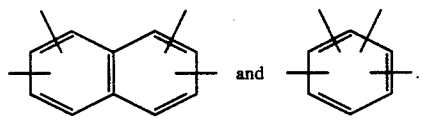

6. The polyimide of claim 1 wherein R is selected from the group consisting of —CH$_2$—, —C$_6$H$_4$—, —C$_6$H$_4$SO$_2$C$_6$H$_4$—, —C$_6$H$_4$CH$_2$C$_6$H$_4$—, —C$_6$H$_4$CH=CHC$_6$H$_4$—, —CH$_2$C$_6$H$_4$—,

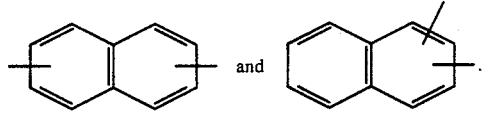

7. The polyimide of claim 1 wherein R° is selected from the group consisting of —H, —CH$_3$ and —C$_6$H$_5$.

8. The polyimide of claim 1 wherein Ar' is

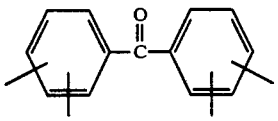

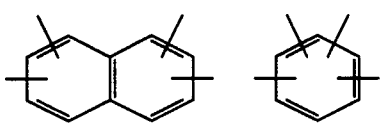

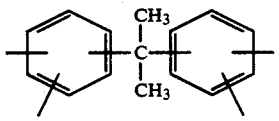

and

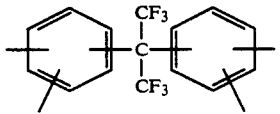

Ar is

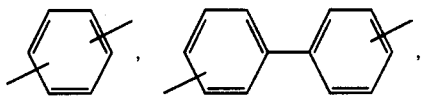

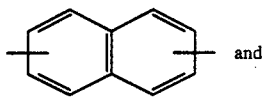 and multiples thereof connected to each other by $R_{11}$, wherein $R_{11}$ is alkylene of 1 to 3 carbon atoms,

—O—, —S—, —CH=CH, and —SO$_2$—, and Ar' is selected from the group consisting of

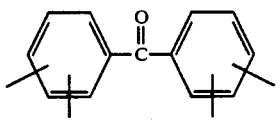

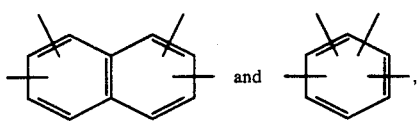

R is —CH$_2$—, —C$_6$H$_4$—, —C$_6$H$_4$SO$_2$C$_6$H$_4$—, —C$_6$H$_4$CH$_2$C$_6$H$_4$—, —C$_6$H$_4$CH=CHC$_6$H$_4$—, —CH$_2$C$_6$H$_4$—,

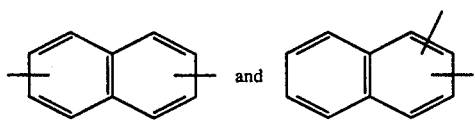 and

R° is selected from the group consisting of —H, —CH₃ and —C₆H₅.

9. The polyimide of claim 8 wherein R° is —H.
10. The polyimide of claim 9 wherein n is 1 to 20.
11. The polyimide of claim 2 wherein Ar' is

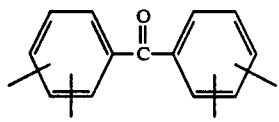

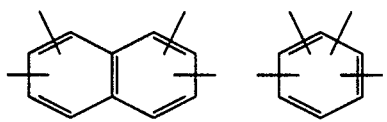

R is —CH₂—, —C₆H₄—, —C₆H₄OC₆H₄—, —C₆H₄SO₂C₆H₄—, —C₆H₄CH₂C₆H₄—, —C₆H₄CH=CHC₆H₄—, —CH₂C₆H₄—,

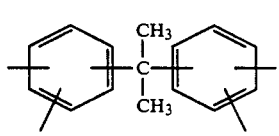 and and R° is —H.

12. The polyimide of claim 2 having the formula:

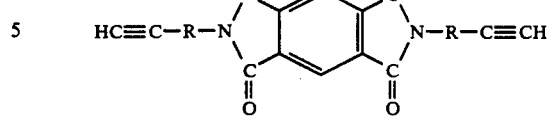

wherein R is —CH₂—, —C₆H₄—, —C₆H₄OC₆H₄—, —C₆H₄SO₂C₆H₄—, —C₆H₄CH₂C₆H₄—, —C₆H₄CH=CHC₆H₄—, —CH₂C₆H₄—,

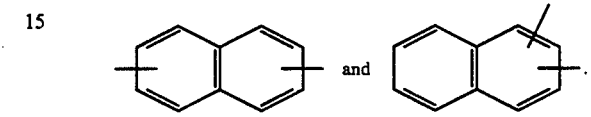

13. The polyimide of claim 12 wherein R is —CH₂—.
14. The polyimide of claim 12 wherein R is —C₆H₄—.
15. The polyimide of claim 2 having the formula:

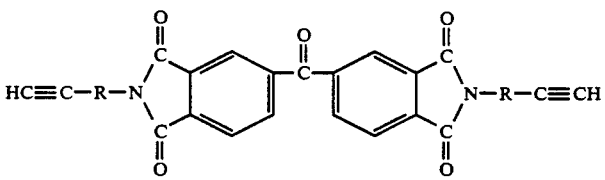

wherein R is —CH₂—, —C₆H₄—, —C₆H₄OC₆H₄—, —C₆H₄SO₂C₆H₄—, —C₆H₄CH₂C₆H₄—, —C₆H₄CH=CHC₆H₄—, —CH₂C₆H₄—,

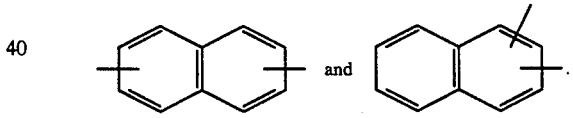

16. The polyimide of claim 15 wherein R is —CH₂—.
17. The polyimide of claim 15 wherein R is —C₆H₄—.
18. The polyimide of claim 2 having the formula:

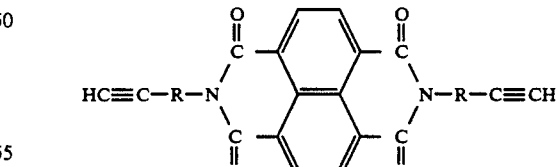

wherein R is —CH₂—, —C₆H₄—, —C₆H₄OC₆H₄—, —C₆H₄SO₂C₆H₄—, —C₆H₄CH₂C₆H₄—, —C₆H₄CH=CHC₆H₄—, —CH₂C₆H₄—,

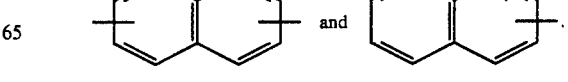

19. The polyimide of claim 18 wherein R is —CH₂—.

20. The polyimide of claim 18 wherein R is —C₆H₄—.

21. The polyimide of claim 2 wherein R is —CH₂— and R° is —H.

22. The polyimide of claim 2 wherein R is —C₆H₄— and R° is —H.

23. A polyimide of the formula:

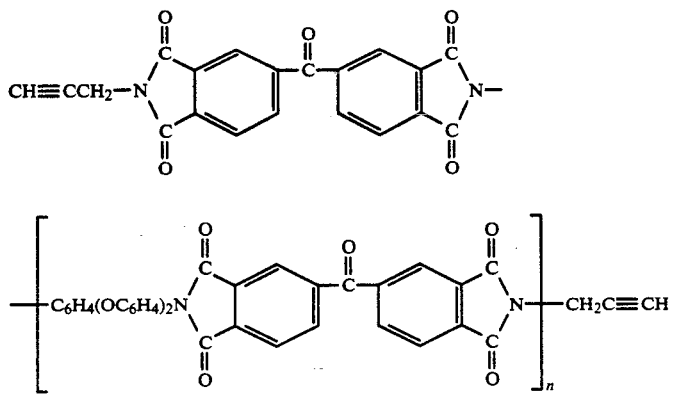

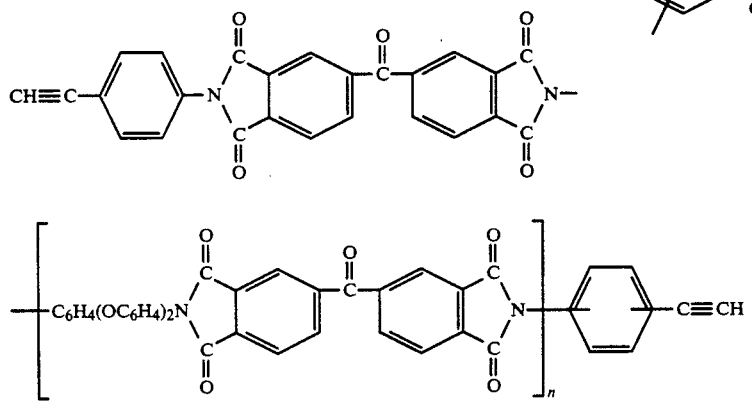

wherein n is a positive integer of at least 2.

24. A polyimide of the formula:

[structures as shown above]

wherein n is a positive integer of at least 2.

25. A process for chain-extending the polyimide of claim 1 comprising heating said polyimide at a temperature in the range of about 150° to about 450° C.

26. The process of claim 25 wherein the polyimide is heated in the presence of a catalytic amount of a cuprous salt catalyst.

27. The process of claim 26 wherein the catalyst concentration is about 0.1 to about 5% by weight, based on the weight of the polyimide.

28. A cured resin derived from the homopolymerization of the polyimide of claim 1.

29. A cured resin of claim 28 wherein n is zero.

30. A cured resin of claim 28 wherein n is 1 to 20.

31. The cured resin of claim 28 wherein Ar' is selected from the group consisting of

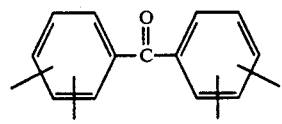

-continued

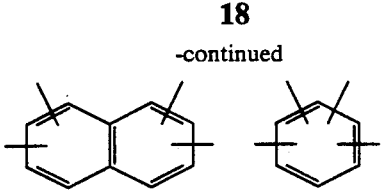

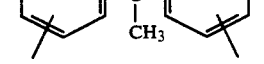

and

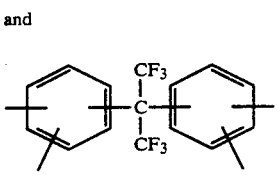

32. The cured resin of claim 28 wherein Ar is from the group consisting of

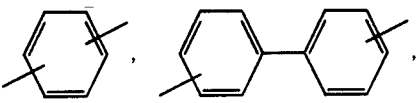

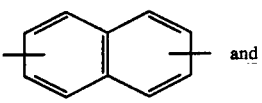 and multiples thereof connected to each other by $R_{11}$, wherein $R_{11}$ is alkylene of 1 to 3 carbon atoms,

—O—, —S—, —CH=CH, and —SO$_2$—, and Ar' is selected from the group consisting of

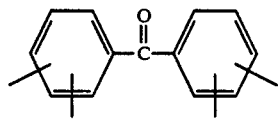

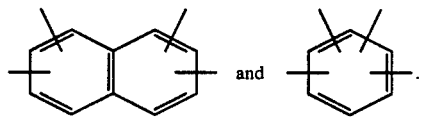

33. The cured resin of claim 28 wherein R is selected from the group consisting of
—CH$_2$—, —C$_6$H$_4$—, —C$_6$H$_4$SO$_2$C$_6$H$_4$—,
—C$_6$H$_4$CH$_2$C$_6$H$_4$—, —C$_6$H$_4$CH=CHC$_6$H$_4$—,
—CH$_2$C$_6$H$_4$—,

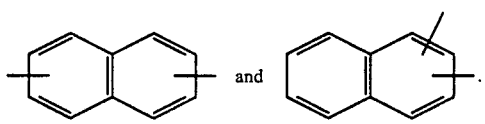

34. The cured resin of claim 28 wherein Ar' is

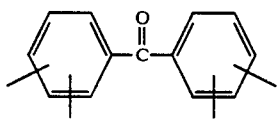

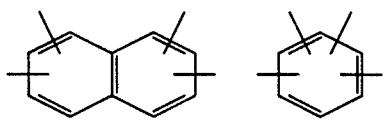

and

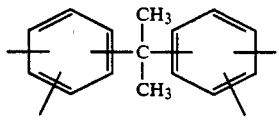

AR is

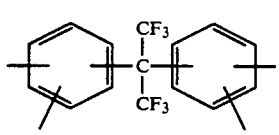

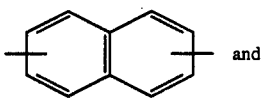

multiples thereof connected to each other by $R_{11}$, wherein $R_{11}$ is alkylene of 1 to 3 carbon atoms,

—O—, —S—, —CH=CH, and —SO$_2$—, and Ar' is selected from the group consisting of

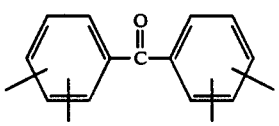

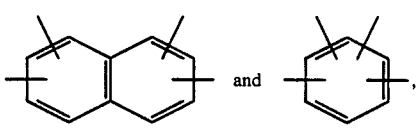

R is —CH$_2$—, —C$_6$H$_4$—, —C$_6$H$_4$SO$_2$C$_6$H$_4$—,
—C$_6$H$_4$CH$_2$C$_6$H$_4$—, —C$_6$H$_4$CH=CHC$_6$H$_4$—,
—CH$_2$C$_6$H$_4$—,

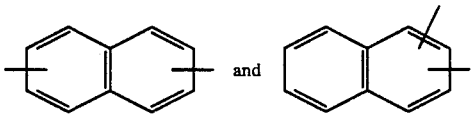

and
R° is selected from the group consisting of —H, —CH$_3$ and —C$_6$H$_5$.

35. The cured resin of claim 34 wherein R° is —H.
36. The cured resin of claim 35 wherein n is 1 to 20.
37. The cured resin of claim 29 wherein Ar' is

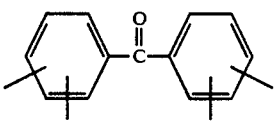

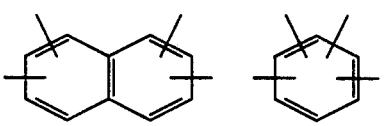

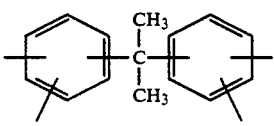

and

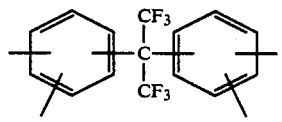
R is —CH₂—, —C₆H₄—, —C₆H₄SO₂C₆H₄—, —C₆H₄CH₂C₆H₄—, —C₆H₄CH=CHC₆H₄—, —CH₂C₆H₄—,
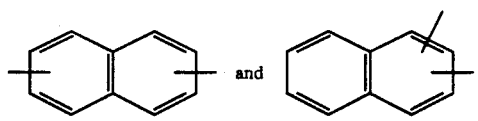
and
R° is —H.
38. The cured resin of claim 29 having the formula:
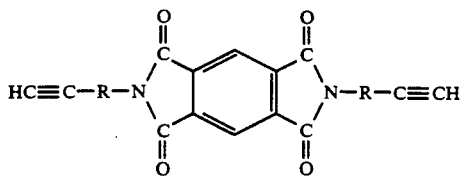
wherein R is —CH₂—, —C₆H₄—, —C₆H₄OC₆H₄—, —C₆H₄SO₂C₆H₄—, —C₆H₄CH₂C₆H₄—, —C₆H₄CH=CHC₆H₄—, —CH₂C₆H₄—,
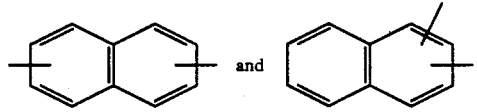
39. The cured resin of claim 38 wherein R is —CH₂—.
40. The cured resin of claim 38 wherein R is —C₆H₄—.
* * * * *